United States Patent
Zeng et al.

(10) Patent No.: US 8,804,330 B2
(45) Date of Patent: Aug. 12, 2014

(54) ELECTRONIC DEVICE WITH HEAT DISSIPATION STRUCTURE

(75) Inventors: Biao Zeng, Wuhan (CN); Zhi-Guo Zhang, Wuhan (CN); Heng Tao, Wuhan (CN); Chao Geng, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 344 days.

(21) Appl. No.: 13/277,163

(22) Filed: Oct. 19, 2011

(65) Prior Publication Data

US 2012/0188709 A1 Jul. 26, 2012

(30) Foreign Application Priority Data

Jan. 26, 2011 (CN) .......................... 2011 1 0028187

(51) Int. Cl.
*G06F 1/20* (2006.01)

(52) U.S. Cl.
USPC .................................................... 361/679.54

(58) Field of Classification Search
USPC .................................................... 361/679.54
See application file for complete search history.

(56) References Cited

U.S. PATENT DOCUMENTS

| | | | |
|---|---|---|---|
| 2008/0218962 A1* | 9/2008 | Fan et al. | 361/687 |
| 2008/0253080 A1* | 10/2008 | He et al. | 361/687 |
| 2010/0073864 A1* | 3/2010 | Hwang et al. | 361/679.47 |
| 2011/0110031 A1* | 5/2011 | Homer et al. | 361/679.54 |
| 2011/0149506 A1* | 6/2011 | Lyon | 361/679.48 |
| 2011/0255240 A1* | 10/2011 | Liao et al. | 361/679.54 |
| 2012/0092826 A1* | 4/2012 | Heidepriem et al. | 361/679.54 |
| 2012/0162907 A1* | 6/2012 | Chiu et al. | 361/679.54 |

* cited by examiner

*Primary Examiner* — Forrest M Phillips
(74) *Attorney, Agent, or Firm* — Novak Druce Connolly Bove + Quigg LLP

(57) ABSTRACT

An electronic device includes a computer, a circuit board, a supporting base attached to a top surface of the circuit board, and a backboard attached to a bottom surface of the circuit board. The case includes a bottom plate. The circuit board defines a through hole. A CPU is located on the supporting base. The backboard defines a retaining hole. The supporting base defines a fixing hole. A heat sink is attached to the supporting base and contacted the CPU. A fixing member is engaged with the retaining hole, the fixing hole and the through hole, to engage the backboard and the supporting base to the circuit board.

13 Claims, 5 Drawing Sheets

ELECTRONIC DEVICE WITH HEAT DISSIPATION STRUCTURE

CROSS-REFERENCE TO RELATED APPLICATIONS

Relevant subject is disclosed in a co-pending U.S. application entitled, "ELECTRONIC DEVICE", filed on Oct. 30, 2011, application Ser. No. 13/284,958.

BACKGROUND

1. Technical Field

The present disclosure relates to electronic devices and, more particularly, to an electronic device with a heat dissipation structure on a circuit board.

2. Description of Related Art

Electronic devices, such as computers, often include a chassis and a circuit board received in the chassis. The layout of the circuitry on the circuit board determines the efficiency of the circuit board. Usually, a plurality of electronic components, such as a heat sink, a CPU, is attached to the circuit board. In assembling the circuit board to the chassis, the heat sink is supported by a tray, the CPU is supported by a supporting bar, and a backboard is located between the circuit board and the chassis. Securing holes must be defined in the circuit board, to secure the tray, the supporting bar and the backboard to the circuit board. However, the plurality of securing holes influences the layout of the circuitry and may decrease the operating efficiency of the circuit board.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
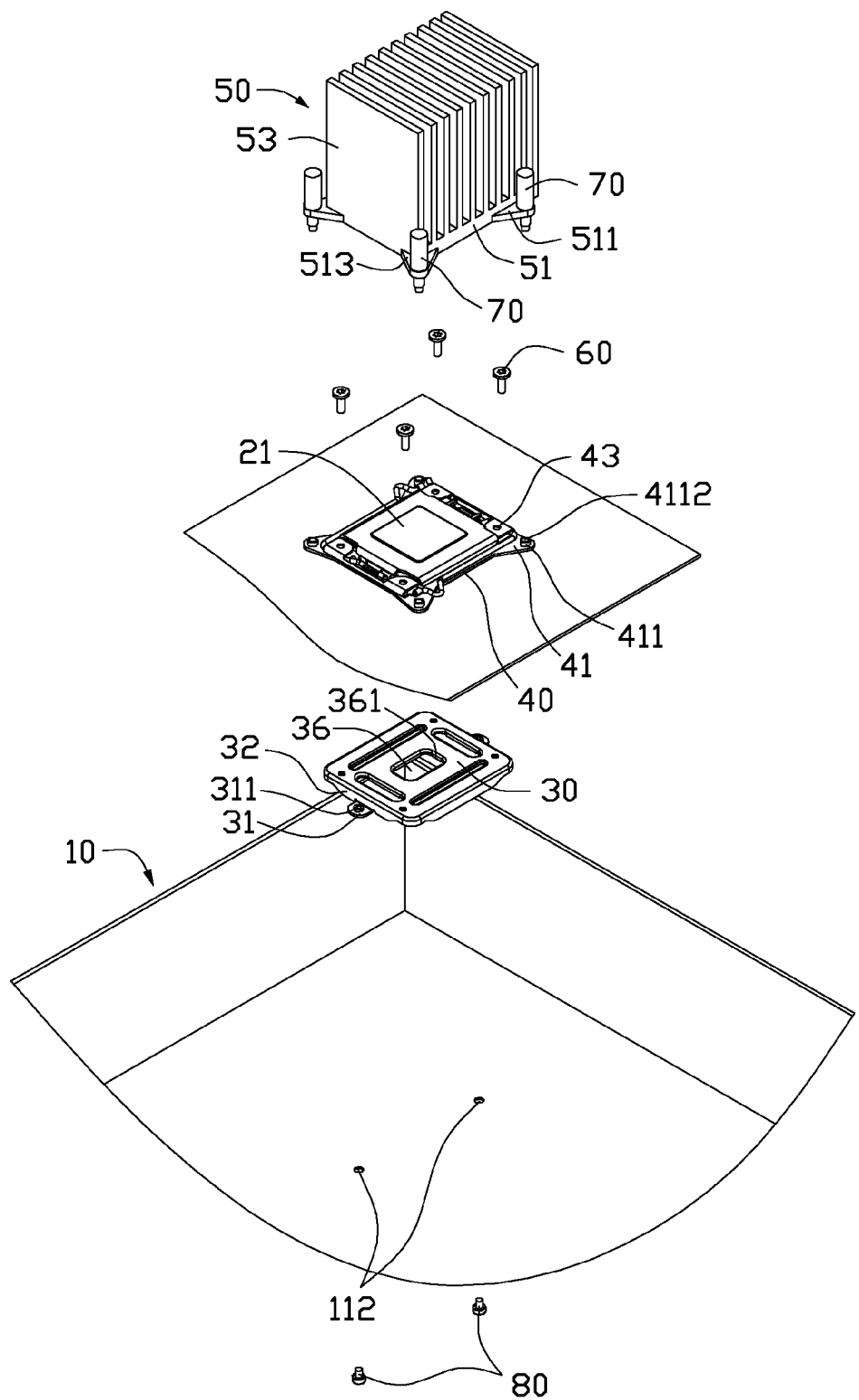
FIG. 1 is an exploded, isometric view of an electronic device in accordance with an embodiment.
Figure 2:
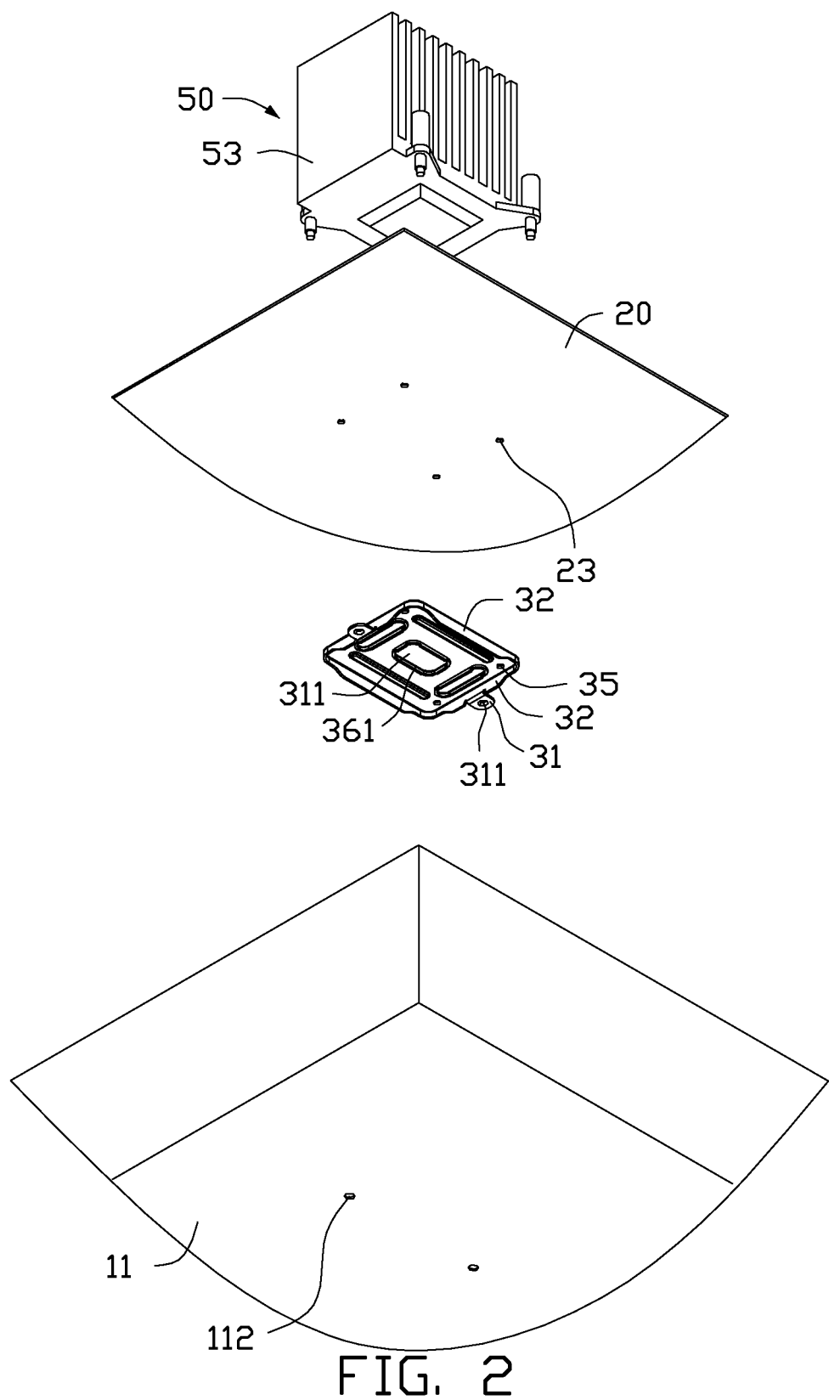
FIG. 2 is similar to FIG. 1, but showing a different aspect.

Referring to FIGS. 1 and 2, an electronic device in accordance with an embodiment includes a case 10, a circuit board 20, a backboard 30, a supporting base 40, and a heat sink 50. The case 10 includes a bottom plate 11, and two securing holes 112 are defined in the bottom plate 11.

The circuit board 20 includes a CPU 21 and defines four through holes 23. In one embodiment, the four through holes 23 are arranged on the corners of a rectangle.

The backboard 30 may be rectangular. Four flanges 32 extend from the four edges of the backboard 30. Two mounting pieces 31 extend from two of the four flanges 32, and each mounting piece 31 defines a mounting hole 311. In one embodiment, the two mounting pieces 31 are arranged on opposing flanges 32, and each mounting piece 31 is substantially perpendicular to each flange 32. Four retaining holes 35 and an opening 36 are defined in the backboard 30. The four retaining holes 35 correspond to the four through holes 23. Four ribs 361 are located on the four edges of the opening 36.

A positioning portion 41 is located on each corner of the supporting base 40. A positioning post 411 with a positioning hole 4112 is defined in the positioning portion 41. In one embodiment, each positioning portion 41 is triangular. Four fixing holes 43, corresponding to the through holes 23 and the retaining holes 35, are defined in the supporting base 40.

The heat sink 50 is attached to the CPU 21 and includes a rectangular base 51 and a plurality of fins 53 attached to the base 51. Two first securing portions 511 and two second securing portions 513 extend from the base 51. A fastener 70 engages with each of the first and second securing portions 511, 513. In one embodiment, the two first securing portions 511 are arranged at two opposing edges of the base 51, and the two second securing portions 513 are arranged on two corners of the base 51. In one embodiment, each first securing portion 511 and each second securing portion 513 are triangular.

Figure 3:
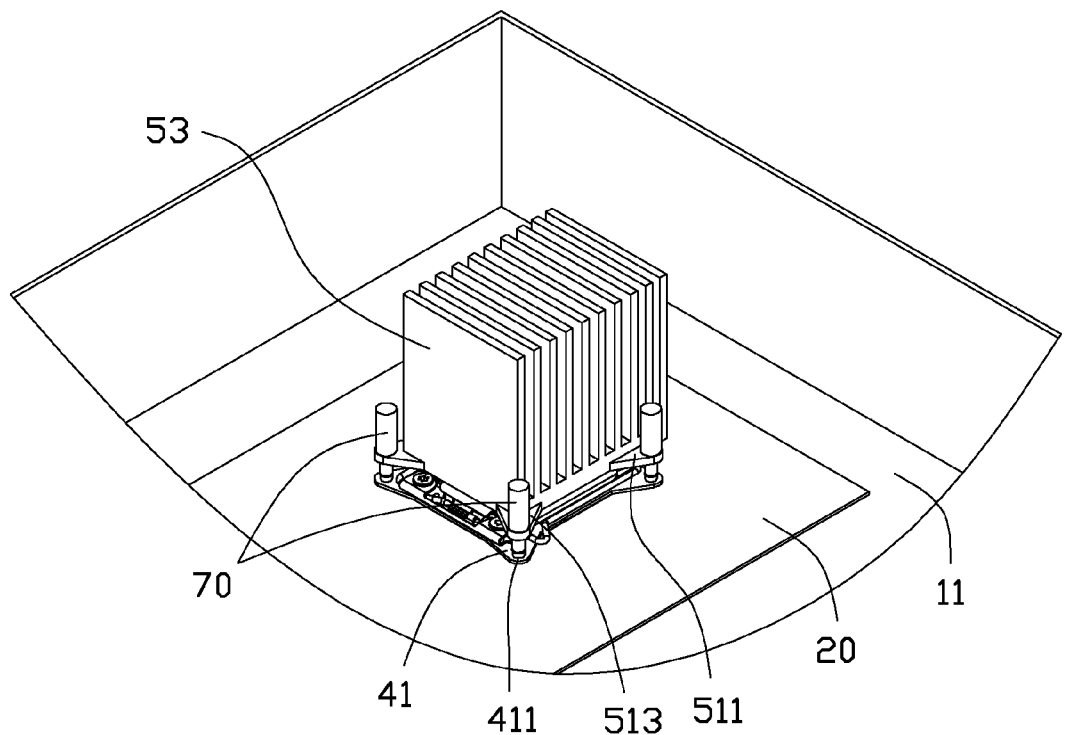
FIG. 3 is an assembled view of FIG. 1.
Figure 4:
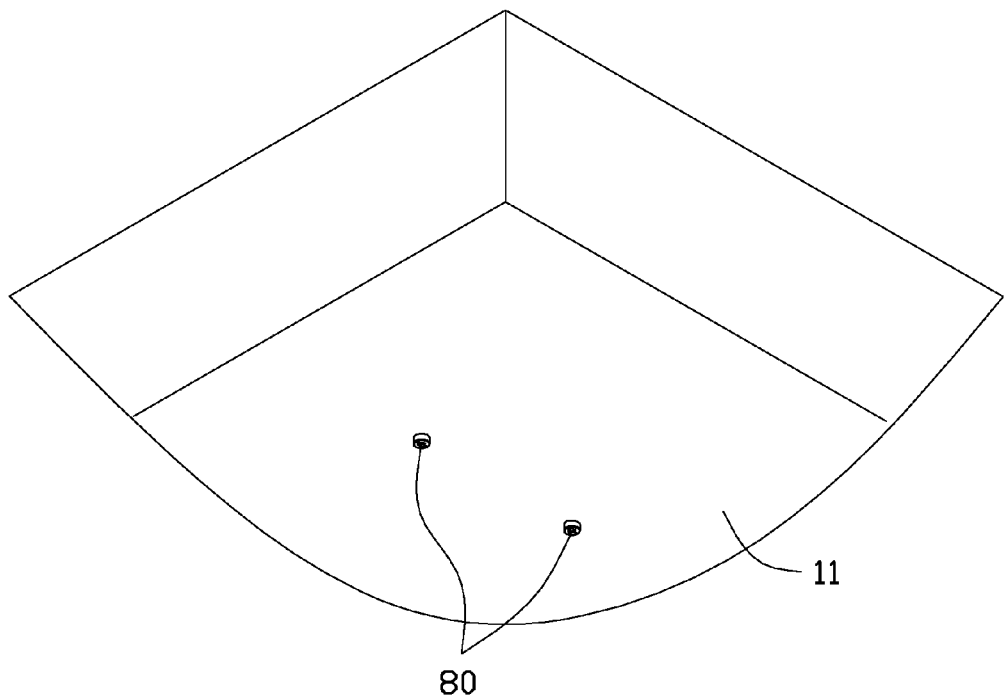
FIG. 4 is an assembled view of FIG. 2.
Figure 5:
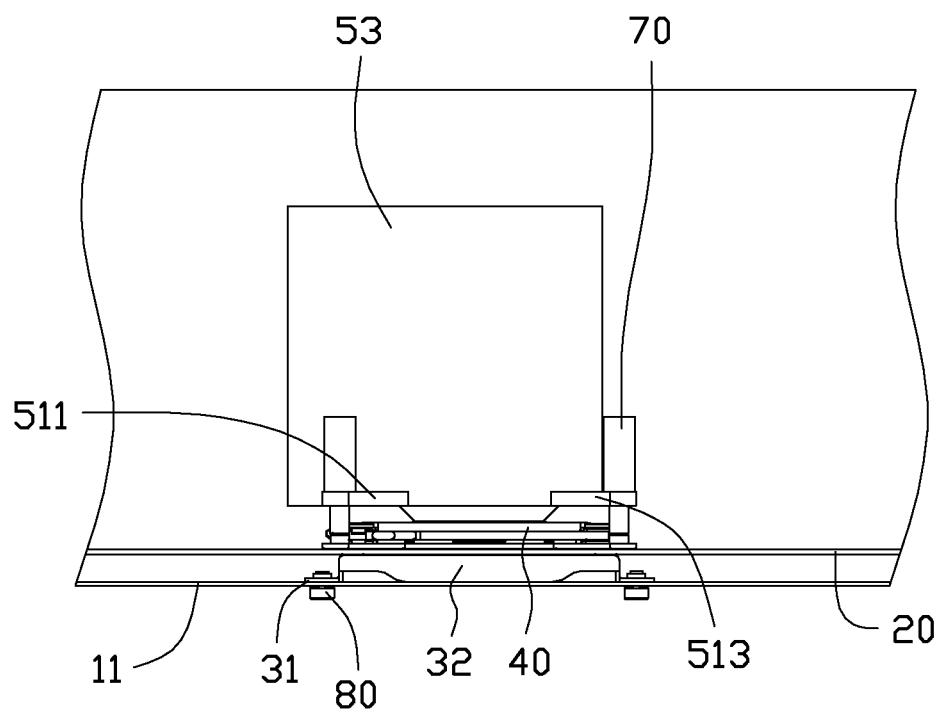
FIG. 5 is a front view of FIG. 3.

Referring to FIGS. 3-5, in assembly, the backboard 20 is attached to the bottom surface of the circuit board 20, and the supporting base 40 is attached to the top surface of the circuit board 20. The through holes 23 are aligned with the retaining holes 35 and the fixing holes 43. The four fixing members 60 are engaged in the through holes 23, the retaining holes 35 and the fixing holes 43 in that sequence, to secure the backboard 30 and the supporting base 40 to the circuit board 20.

The heat sink 50 is attached to the top surface of the supporting base 40, and the first and second securing portions 511, 513 are attached to the positioning portions 411. The fasteners 70 are received in the positioning holes 4112, and the heat sink 50 is thus secured to the supporting base 40. Therefore, the heat sink 50, the supporting base 40, the backboard 30 and the circuit board 20 are mounted together.

The heat sink 50, the supporting base 40, the backboard 30 and the circuit board 20 are received in the case 10, and the backboard 30 is attached to the bottom plate 11. The mounting holes 311 are aligned with the securing holes 112. Two fastening members 80 are engaged in the mounting holes 311 and the securing holes 112. The backboard 30 is secured to the bottom plate 11.

In disassembly, the removal of the fastening members 80 allows the backboard 30 to be detached from the case 10. The fasteners 70 are disengaged from the positioning holes 4112, and the heat sink 50 can be removed from the circuit board 20. The fixing members 60 are removed from the through holes 23, the retaining holes 35 and the fixing holes 43, and the backboard 30 and the supporting base 40 can be detached from the circuit board 20.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   a case comprising a bottom plate;
   a backboard attached to the bottom plate; a flange extending from the backboard, and the backboard comprising a mounting piece directly connected to the flange; the flange substantially perpendicular to the mounting piece and the backboard, and the mounting piece secured to the bottom plate;

a circuit board attached to the backboard;

a supporting base attached to a top surface of the circuit board;

a CPU located on the supporting base;

a heat sink attached to the supporting base and contacting the CPU; and a fixing member;

wherein the fixing member engages the backboard and the supporting base to the circuit board.

2. The electronic device of claim 1, wherein the bottom plate defines a securing hole, the mounting piece defines a mounting hole, and a fastening member is engaged in the mounting hole and the securing hole to secure the backboard to the bottom plate.

3. The electronic device of claim 1, wherein an opening is defined in the backboard, and a rib extends across the opening.

4. The electronic device of claim 1, wherein the supporting base comprises four positioning portions arranged at four corners of the supporting base, the heat sink comprises two first securing portions and two second securing portions, and the two first securing portions and the two second securing portions are engaged with the four positioning portions.

5. The electronic device of claim 4, wherein the heat sink comprises a rectangular base, the two first securing portions extend from opposite edges of the rectangle base, and each second securing portion is connected to two adjacent edges of the rectangle base.

6. The electronic device of claim 4, wherein each positioning portion is triangle, and each first securing portion and each second securing portion are triangle.

7. The electronic device of claim 1, wherein the backboard is located between the bottom plate and the circuit board.

8. An electronic device comprising:

a case comprising a bottom plate;

a circuit board comprising a CPU and a heat sink attached to the CPU; the heat sink comprising a base, and the base comprising a first securing portion and a second securing portion; the first securing portion extending from an edge of the base, and each securing portion connected to two adjacent edges of the base;

a supporting base comprising two positioning portions; and a backboard located between the circuit board and the bottom plate; a flange extending from the backboard, and the backboard comprising a mounting piece directly connected to the flange; the flange substantially perpendicular to the mounting piece and the backboard, and the mounting piece secured to the bottom plate;

wherein the first securing portion and the second securing portion are engaged with the two positioning portions, the backboard and the supporting base are engaged with the circuit board, and the backboard is engaged with the bottom plate.

9. The electronic device of claim 8, wherein the supporting base is attached to a top surface of the circuit board, and the backboard is attached to a bottom surface of the circuit board.

10. The electronic device of claim 8, wherein a fastener is engaged with the first securing portion, and the positioning portion comprises a positioning post engaged with the fastener.

11. The electronic device of claim 8, wherein an opening is defined in the backboard, and a rib extends across the opening.

12. The electronic device of claim 8, wherein each positioning portion is triangle, and the first securing portion and the second securing portion are triangle.

13. The electronic device of claim 8, wherein the bottom plate defines a securing hole, the mounting piece defines a mounting hole, and a fastening member is engaged in the mounting hole and the securing hole to secure the backboard to the bottom plate.

\* \* \* \* \*